June 23, 1936.  E. L. HEID  2,045,554
TIRE BUILDING APPARATUS
Filed April 12, 1934  3 Sheets-Sheet 1
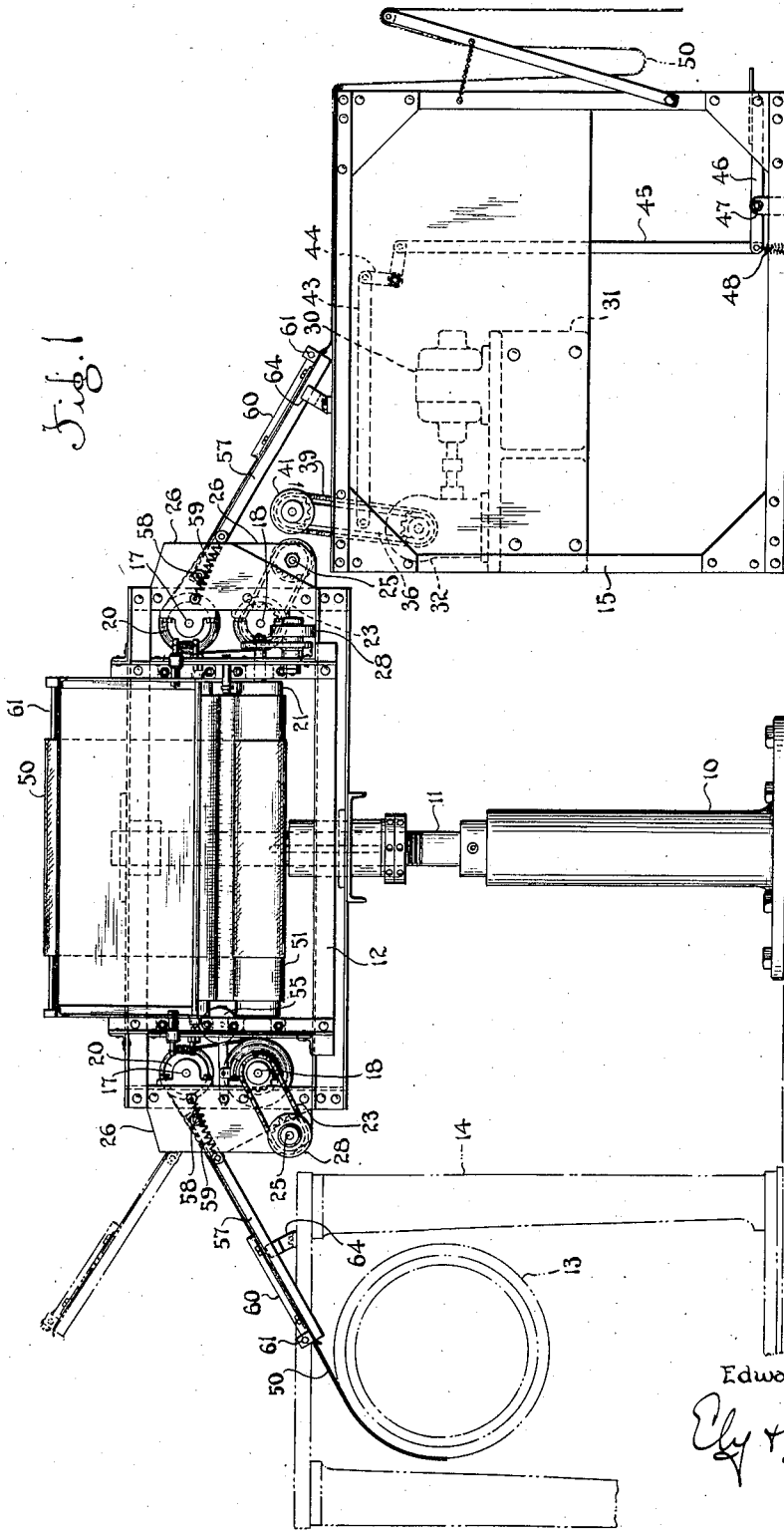
INVENTOR
Edward L. Heid
Ely & Barrow
ATTORNEYS

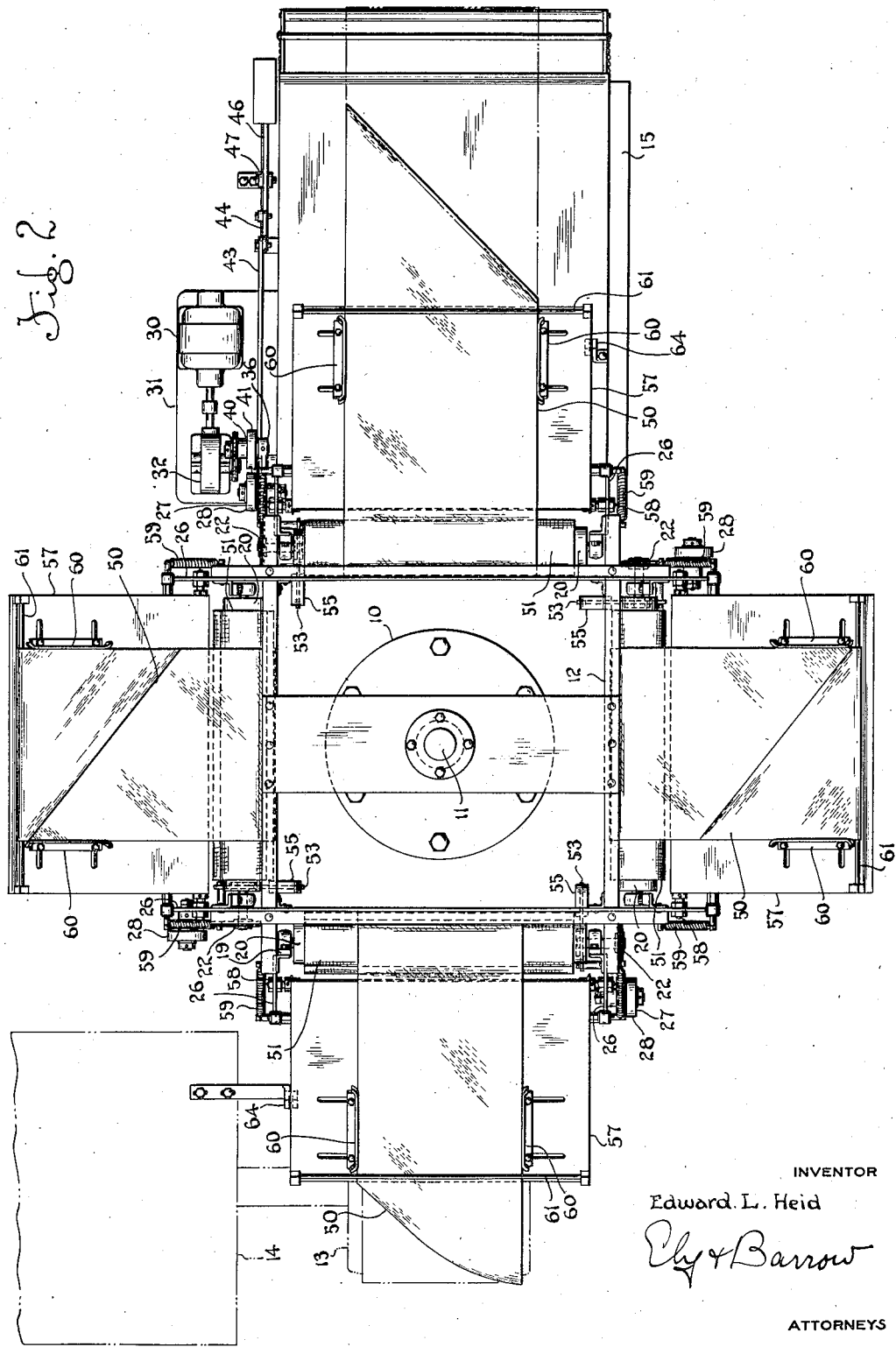

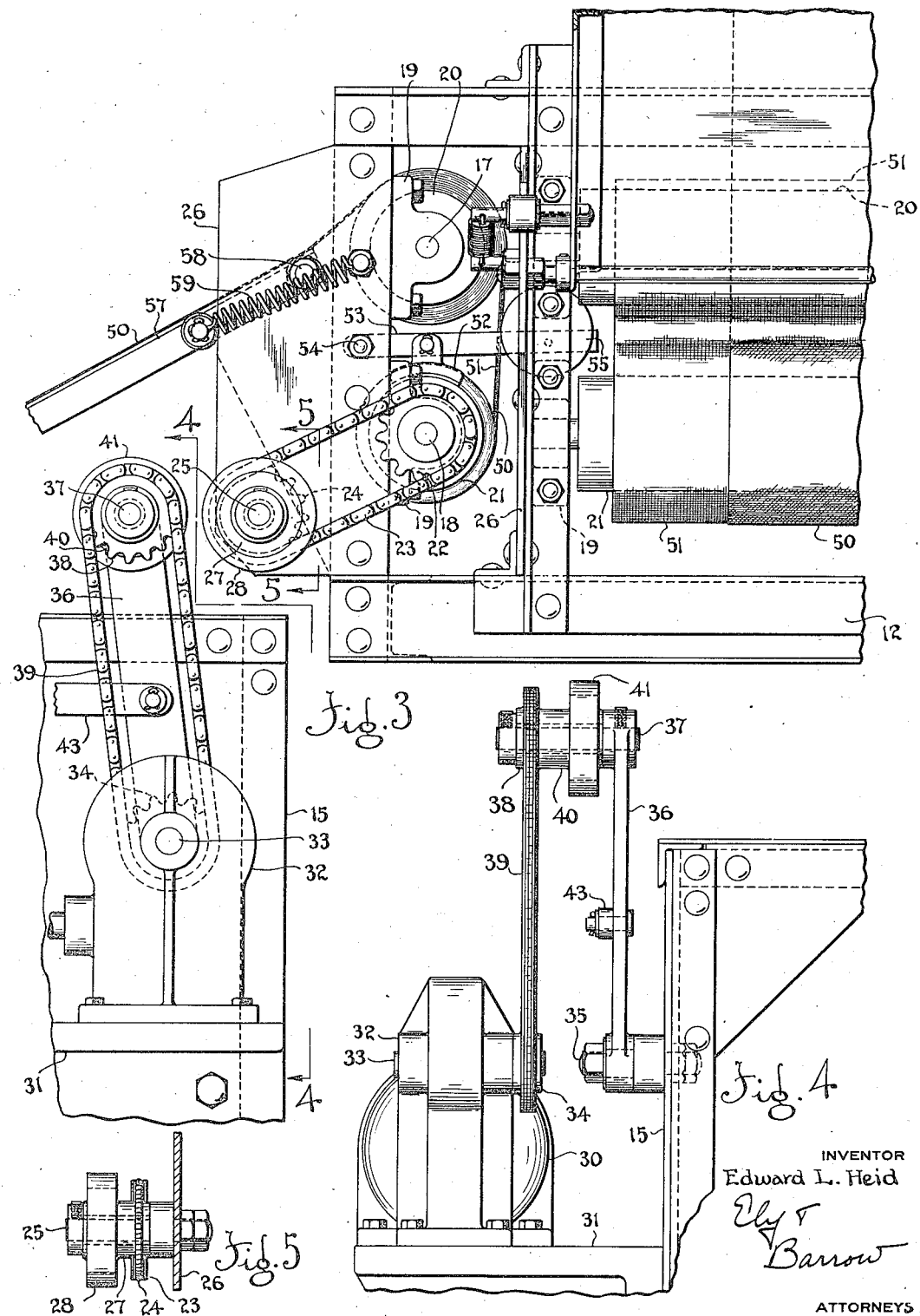

Patented June 23, 1936

2,045,554

UNITED STATES PATENT OFFICE 2,045,554

TIRE BUILDING APPARATUS

Edward L. Heid, Akron, Ohio, assignor to The Firestone Tire & Rubber Company, Akron, Ohio, a corporation of Ohio Application April 12, 1934, Serial No. 720,230

1 Claim. (Cl. 154—10)

This invention relates to tire building apparatus, and more especially it relates to apparatus for storing quantities of tire building material in proximity to a tire building machine so as to be withdrawn by the latter in the building of pneumatic tire casings.

The invention is an improvement over the prior practice of preparing fabric for tire building which comprised splicing strips of rubberized, bias-cut fabric end to end to form a continuous strip of relatively long length, and winding the said strip on a roll with a liner. These operations were performed remote from a tire building machine, and the rolls of fabric frequently were stored for some time before use. The practice was wasteful in that it required the use of a large amount of liner, numerous shells or rolls on which to wrap the same; it required space for storage of the stock; it required transportation of the rolls of stock from one point to another, and time of the tire builder was required for mounting rolls of fabric for use at the tire building machine.

The chief objects of the invention are to avoid the use of large amounts of liner and shells for winding fabric and liner; to avoid storing of large amounts of tire building fabric after it has been bias-cut to width; and to save time and labor and thus to expedite the building of pneumatic tires. Other objects will be manifest.

Of the accompanying drawings:

Figure 1 is an elevation of apparatus embodying the invention, in its preferred form;

Figure 2 is a plan view thereof;

Figure 3 is an elevation, on a larger scale, of a portion of the apparatus shown in Figure 1, as viewed from the rear thereof;

Figure 4 is a section on the line 4—4 of Figure 3; and

Figure 5 is a section on the line 5—5 of Figure 3.

Referring to the drawings, 10 is a pedestal base or support, 11 is a vertical spindle rotatably mounted therein, and 12 is a turret that is mounted upon said spindle and is vertically adjustable thereon. The turret 12 consists of an open metal framework that carries a plurality of rolls of tire building material, preferably of various widths and bias angles, sufficient for the building of a pneumatic tire casing. The turret framework as shown has four sides although obviously it may have more or less than four if desired. When in operative position, one side of the turret is in a work-delivery position wherein it is aligned with the tire-building form or drum 13 of a tire-building machine 4. Another side of the turret, (the opposite side as herein illustrated) is in work-receiving position in alignment with a work-table 15 whereon a length of tire-building fabric may have its leading end spliced to the trailing end of a strip already in the apparatus.

The stock rolls and their driving mechanism on the respective sides of the turret are identical in structure so that a description of one of them will be sufficient.

Upon each side of the turret is a pair of parallel, horizontal shafts 17, 18 that are disposed one above the other in a vertical plane and journaled at their respective ends in journaled brackets 19 that are mounted on the framework of the turret. Mounted upon the upper shaft 17, is a liner rewinding roll or shell 20, and mounted upon the shaft 18 is a roll or shell 21 upon which liner and tire building fabric is wound. One end of shaft 18 extends beyond its bearing bracket and is provided thereat with a sprocket 22 that is connected by a sprocket chain 23 to a sprocket 24 journaled on a stub shaft 25. The latter is mounted on and projects laterally from a plate 26, there being a pair of the latter secured to turret frame 12 and projecting outwardly therefrom on each side of the turret. The hub of sprocket 24 is formed with a relatively wide disc 27 that has its periphery covered with frictional material 28 such as leather, as is most clearly shown in Figure 5, the perimeter of the friction disc preferably being larger than sprocket 24. The friction disc constitutes part of the means by which the roller 21 may be power-driven, upon occasion, when tire building fabric is to be fed thereonto.

For driving the said friction disc, a motor 30 is mounted upon a bracket 31 that is secured to the frame of table 15 and extends laterally therefrom, said motor being connected to a reduction gear device 32 having a drive shaft 33 upon which is amounted a sprocket 34. A spindle 35 is mounted upon the frame of table 15 in axial alignment with shaft 33, and pivotally mounted upon said spindle is a swinging arm 36 upon the free end of which is a laterally projecting stub-shaft 37 upon which is journaled a sprocket 38 that is connected by sprocket chain 39 with sprocket 34. The hub of sprocket 38 is formed with a disc 40 that is similar to disc 27 and has a peripheral covering of friction material 41. The arrangement is such that the arm 36 may be swung angularly on its pivot to carry the friction disc 40 into frictional driving engagement with disc 27.

For so swinging arm 36, a link 43 is connected thereto and has connection, through bell-crank 44 mounted on the table frame, with a link 45 connected to one end of a foot-lever 46 that is pivotally mounted in a bracket 47 on the floor beneath the table 15. A tension spring 48 connected to one end of foot-lever 46 and to a fixed point normally functions to hold arm 36 in retracted position, with disc 40 in spaced relation to disc 27.

The strips of tire-building fabric shown herein are designated 50, and the liners are designated 51. The liner has its respective ends connected to liner rewind roll 20 and to roll 21, the arrangement being such that it may be wound onto said rolls in alternation as it is unwound from the other roll. The rolls 20, 21 are so arranged that the fabric strip 50 passes over liner rewind roll 20 as it is wound onto roll 21 and as it is withdrawn therefrom. Thus roll 20 is rotated in one direction by the withdrawal of liner therefrom, and is driven in the opposite direction by the friction of the fabric strip 50 as the latter is drawn thereover in passing from supply roll 21 to the tire-building drum 13, in which direction of rotation roll 20 rewinds the liner 51 thereon. Over-run of roll 21 when driven by motor 30 or by the withdrawal of fabric therefrom is prevented by a brake shoe 52 that rests upon one end of the roll, said brake shoe being pivotally mounted upon an arm 53 that is pivotally connected at one end to the turret frame at 54, there being a weight 55 adjustably mounted upon the free end of said arm 53.

For guiding and supporting the fabric strip 50 from the table 15 onto roll 20 and from roll 20 onto drum 13, there is provided a tray 57 that is pivotally mounted at 58 upon and between plates 26. An over-center tension spring 59 is connected to tray 57 and to the turret frame in such a manner as yieldingly to urge the free end of the tray downwardly to an operative position adjacent drum 13 or table 15, as shown in full lines in Figure 1, or alternatively to an elevated, inoperative position shown in broken lines in said figure. The tray 57 is provided with a pair of laterally adjustable guides 60, 60 for engaging the respective lateral margins of strip 50 to guide it accurately to the roll 21 or drum 13, and the free end of the tray is provided with a slightly elevated rod 61 under which said strip passes and about which the adjacent end of the said strip may be folded to retain it in place when the tray is in an elevated, inoperative position as shown in Figure 2. Slotted brackets 64, 64 may be mounted upon the tire machine 14 and table 15 respectively in position to receive respective frame portions of the trays 57 whereby the turret is retained in proper angular position to deliver fabric to drum 13 or to receive fabric from the table 15.

In the operation of the apparatus, fabric strips 50 may be fed to a supply roll 21 on one side of the apparatus at the same time that fabric is being withdrawn from a supply roll at another side of the apparatus. To supply the apparatus with fabric, an operator at the table 15 places a strip 50 of fabric thereon and splices one of its ends to that end of the fabric in the turret that is on the adjacent tray 57, said tray being lowered to operative position for this purpose by the operator. After the fabric is spliced, the operator steps on foot lever 46 and thus moves the constantly driven friction disc 40 into driving engagement with disc 27, whereby the supply roll 21 is driven to wrap the strip 50 thereon together with liner 51 that is concurrently withdrawn from rewinding roll 20. The operator releases foot lever 46 as soon as the trailing edge of the strip being fed reaches the tray 57, the operator then anchoring said trailing edge by folding it about the rod 61 at the free end of the tray. The operator then raises the tray to inoperative position. If at this time no fabric is being withdrawn by the tire machine, the operator may rotate the turret to bring another side of the turret into alignment with table 15 and repeat the operation. Usually it is possible for one operator to supply fabric to several turrets.

Removal of fabric from the turret is under the control of the tire builder at tire machine 14. He lowers a tray to operative position whereby the free end of the tray is disposed adjacent the building drum 13. He then attaches the end portion of the strip 50 on the tray to the drum or to the fabric plies already thereon, and rotates the drum to withdraw the fabric strip from supply roll 20 and wrap it about the drum. In passing over the liner rewinding roll 20, the moving fabric strip drives the latter and thus rewinds the liner thereon as said liner is withdrawn, with the fabric strip, from roll 20. After the proper amount of fabric is withdrawn, the operator severs the strip, anchors an end thereof over rod 61 of the tray, and raises the latter to inoperative position. If no fabric at this time is being fed into the turret, the operator may rotate the turret and repeat the operations described at another side thereof.

The invention saves time, labor and floor space, and accomplishes the other objects set out in the foregoing statement of objects.

Modification may be resorted to without departing from the spirit of the invention or the scope of the appended claim, which is not limited wholly to the specific construction shown and described.

What is claimed is:

In apparatus of the character described, the combination of a supply roll of liner and tire-building fabric, a liner rewinding roll associated therewith, means for moving said rolls between a fabric-receiving station and a fabric delivery station, drive means comprising a friction disc connected with said supply roll, a constantly driven motor at the fabric-receiving station, a friction disc driven thereby, and manually operated means for moving the last-mentioned friction disc into driving engagement with the first-mentioned friction disc.

EDWARD L. HEID.